(12) United States Patent
Levesque et al.

(10) Patent No.: US 8,788,612 B1
(45) Date of Patent: Jul. 22, 2014

(54) CACHE BASED ENHANCEMENT TO OPTIMIZATION PROTOCOL

(75) Inventors: Michel Levesque, Drummondville (CA); Emmanuel Papirakis, Trios-Riveires (CA)

(73) Assignee: Unwired Planet, LLC, Reno, NV (US)

( * ) Notice: Subject to any disclaimer, the term of this patent is extended or adjusted under 35 U.S.C. 154(b) by 2356 days.

(21) Appl. No.: 11/462,950

(22) Filed: Aug. 7, 2006

(51) Int. Cl.
*G06F 15/16* (2006.01)

(52) U.S. Cl.
USPC .......................................... 709/217; 709/219

(58) Field of Classification Search
None
See application file for complete search history.

(56) References Cited

U.S. PATENT DOCUMENTS

| | | | |
|---|---|---|---|
| 6,289,382 B1 * | 9/2001 | Bowman-Amuah | 709/226 |
| 6,529,948 B1 * | 3/2003 | Bowman-Amuah | 709/217 |
| 6,947,440 B2 * | 9/2005 | Chatterjee et al. | 370/429 |
| 6,990,534 B2 | 1/2006 | Mikhailov et al. | |
| 7,003,284 B2 | 2/2006 | Schwartz et al. | |
| 7,024,473 B2 | 4/2006 | Parent | |
| 2002/0046264 A1 * | 4/2002 | Dillon et al. | 709/219 |
| 2003/0018714 A1 | 1/2003 | Mikhailov et al. | |
| 2003/0078964 A1 * | 4/2003 | Parrella et al. | 709/203 |
| 2003/0079041 A1 * | 4/2003 | Parrella et al. | 709/247 |
| 2003/0084177 A1 | 5/2003 | Mulligan | |
| 2003/0092376 A1 | 5/2003 | Syed | |
| 2005/0096016 A1 | 5/2005 | Tervo et al. | |
| 2006/0253546 A1 * | 11/2006 | Chang et al. | 709/217 |
| 2007/0260748 A1 * | 11/2007 | Talkington | 709/246 |

OTHER PUBLICATIONS

Deffinition of "Birthday paradox," *Wikipedia*, Feb. 5, 2007 <http://en.wikipedia.org/wiki/Birthday_paradox>, pp. 1-9.
Network Working Group, "The Point-to-Point Protocol (PPP)," Feb. 5, 2007 <http://www.faqs.org/rfcs/rfc1661.html>, pp. 1-39.
Flash Networks product information for NettGain™ Allegro, Feb. 5, 2007 <http://www.flashnetworks.com/files/pdf/NettGain_Allegro_Brochure.pdf>, 3 pages.
Flash Networks product information for NettGain™, Feb. 5, 2007 <http://www.flashnetworks.com/files/pdf/1200brochure.pdf>, 6 pages.
Flash Networks product information for NettGain™ Maestro, Feb. 5, 2007 <http://www.tlashnetworks.com/files/pdf/NettGain_Maestro_Brochure.PDF>, 4 pages.

* cited by examiner

*Primary Examiner* — Krista Zele
*Assistant Examiner* — Keyvan Emdadi

(57) ABSTRACT

A system, apparatus, and method for improving the user experience when accessing web pages containing embedded objects over a network. In one embodiment, information regarding the contents of a locally accessible cache is added to a request directed to a web server. The information is used to control certain aspects of a pre-fetch process that is designed to reduce network latency affects and improve network resource utilization, thereby improving a user's experience. The cache contents information may be provided to an intermediate server via a modification to an existing request-response protocol, with the information being encoded or compressed if desired to reduce data transport requirements. The information is used by the intermediate server to determine whether to request an embedded object referenced in the requested resource or web page, and to determine if a browser having access to the cache will request the object or access the object from the local cache.

23 Claims, 5 Drawing Sheets

CACHE BASED ENHANCEMENT TO OPTIMIZATION PROTOCOL

BACKGROUND OF THE INVENTION

The present invention is directed to methods and apparatus used to optimize the transfer of data between a client device and server over a network, and more specifically, to a method of using a browser cache in coordination with a parse-push protocol to improve the transfer of web pages and objects over a wireless or other network.

The transfer of data over a wireless network between a client (such as a wireless phone or PDA) and a server (such as a web server) is subject to multiple factors that can affect the end user experience. These include the bandwidth of the network and the degree of latency experienced by a user when requesting a web page or an object embedded within a web page. Note that an "embedded" object may refer to a reference or link to a resource, an image, JavaScript™, style-sheet, etc. Latency refers to the delay in transferring a requested page or object over the network and its subsequent presentation to a user on their client device. The degree of latency experienced by a user can be a function of the complexity of the web page, the size of the page or object, and the characteristics of the network utilized to transfer the page or object from a server to the client device. For example, if the network is of lower bandwidth or experiences high latency due to its protocol for handling requests, the user experience is degraded, particularly when requesting complex pages, larger size objects, or multiple objects. Note that although the present invention will be described primarily with reference to the transfer of data over a wireless network, the inventive systems, apparatus and methods may be utilized in the context of a wire line or wireless network, or combination of such networks.

In addition to network or content characteristics, the capabilities of the client device may affect the user experience negatively when requesting certain types of content. For example, some mobile phones are constrained by having limited memory space or small displays; both aspects can contribute to making the display of a large web-page problematic. Moreover, if a device does not support a given type of content (e.g., cannot view jpeg images), then if the response contains that type of content, some bandwidth and network infrastructure would be consumed for no benefit in providing the response.

FIG. 1 is a block diagram of the components of a prior art system 100 that can be used to reduce the latency and network characteristics that may degrade a user's experience. The figure illustrates certain functional components of an implementation of a Parse-Push Protocol (hereinafter referred to as "PPP") that together, can be used to reduce network latency in responding to a user's requests, and also the burden placed on the network (i.e., the number of request/response messages conveyed by the network). In one implementation, the PPP is a client-server HTTP optimization protocol that can be used to enhance the user experience over slower, higher latency networks such as 2.5G and 3G wireless cellular networks.

The PPP is a protocol that alters the standard HTTP protocol behavior to optimize certain aspects of the usage of the network between the server and the client. One use of the PPP is to pre-fetch embedded objects associated with a web page and then push them to the client or to a storage location accessible by the client before a formal request is made for the object. This effectively reduces the delay in servicing the request (i.e., the perceived latency) and the transfer time required to receive the object when a request is made by a browser. Implementing the PPP requires installation of client-side software, as well as a server-side component. As shown in FIG. 1, system 100 includes a mobile device 102 that communicates over a network 104 with a web server 106. An application in mobile device 102, shown in the figure as a browser 108 issues a request in conformance with a protocol (e.g., HTTP). The request is transferred over network 104 to web server 106, which processes the request and prepares a response. The response is transferred over network 104 to mobile device 108. Note that mobile device is typically a mobile wireless phone, and network 104 is typically a wireless network or combination of wire line and wireless networks.

In accordance with one implementation of PPP, a client side element, depicted as PPP client 110 and server side element, depicted as PPP server 112 are introduced. Note that as shown in the figure, PPP client 110 communicates with browser 108 using a HTTP protocol, and that PPP client 110 is positioned in the data flow between browser 108 and network 104. PPP server 112 communicates with web server 106 using a HTTP protocol, and is positioned between web server 106 and network 104.

FIG. 2 is a flowchart 200 illustrating the request/response message flow between the functional elements of FIG. 1 when implementing that version of a parse-push protocol. As shown in the figure, a typical flow of request/response messages would be as follows:

(1) The browser 108 issues a HTTP request for a web page or object (step 202)

(2) The PPP client 110 intercepts the HTTP request from the browser and forwards it to the PPP server 112 (step 204). The PPP client 110 is responsible for performing any required translation between HTTP and the relevant PPP protocols (e.g., as the result of adding instructions within the HTTP header for the PPP server, or to transform aspects of the HTTP protocol into another format).

(3) The PPP server 112 forwards the request to the web content server 106 (step 206). Note that the PPP server 112 can act as a HTTP proxy server, translating between the PPP and HTTP protocols if required. Generally speaking, no translation is required. However, if an aspect of the HTTP protocol has been transformed such that the web server would not understand it, it is the responsibility of the PPP server to ensure compliance to the HTTP specification when forwarding requests to the web server.

(4) Upon receipt of the request, the web content server 106 processes the request and prepares a response, which is sent to the PPP server 112 (step 208).

(5) The PPP server 112 examines the response (step 210) to determine the content type(s) of the response. For example, if the content type is a markup content (HTML, XML, XHTML, etc.), server 112 parses the response to identify all embedded objects in the response (e.g., by determining the URI or other form of reference for each object). As noted, an "embedded" object may refer to a reference or link to a resource, an image, JavaScript™, style-sheet, etc. Note that if the response is not markup content or of a type susceptible to the described parsing operation, it may simply be forwarded to the PPP client 110, which will forward it to the browser 108.

(6) The response is then pushed to the PPP client 110 (step 212), with a list of the references for the embedded objects that were identified in the parsing step. Note that the list of object references (e.g., URIs) can be provided by inserting them into a HTTP header in the message. The list is used to make PPP client 110 aware of which objects are going to be pushed to it by PPP server 112.

(7) The PPP client 110 then forwards the response to browser 108 (step 214). Browser 108 now has received the standard response to its request (e.g., a web page containing references to embedded objects). As noted previously, the PPP client typically acts to ensure that the response forwarded to the browser is compliant with the HTTP specification. This may include, for example, removing the HTTP headers added by the PPP server.

(8) PPP server 112 then issues a request or requests for each of the identified objects in the original response (steps 216, 220, and 224). In response to each such request, web server 106 responds to the request by providing the requested object to PPP server 112 (steps 218, 222, and 226). Upon receipt of a response, PPP server 112 pushes the object to PPP client 110 (steps 219, 223, and 227), along with an indicator of the reference (e.g., URI) of the pushed object.

(9) PPP client 110 stores the received objects and reference indicators in a local buffer (step 230).

(10) Each time that browser 108 issues a request for an embedded object in the page (steps 240, 244, and 248), PPP client 110 intercepts the request and responds to that request by: (a) directly providing the requested object (if stored in PPP client 110); (b) waiting for PPP server 112 to push the requested object if it is not stored in PPP client 110 and is part of the object list pushed to PPP client 110 in step 212; or (c) submits a request for the object to PPP server 112. Note further that in some cases, the request might be submitted to web content server 106 instead if that approach would lead to a more optimal use of network infrastructure resources and result in a more desirable user experience.

Although the parse-push protocol and example system described above can provide improved performance relative to a standard request-response protocol, it does not prove an optimal solution. Specifically, the protocol as described does not take into account the possibility that the browser has access to cached data that may be used to respond to a request, e.g., one of the requested embedded objects. This means that the parse-push protocol as described may still transfer unnecessary messages and data relative to a more optimal implementation.

What is desired is a system, apparatus and method for improving a user's experience when accessing a web page that includes embedded objects and that overcomes the disadvantages or present systems, apparatus and methods.

BRIEF SUMMARY OF THE INVENTION

The present invention is directed to a system, apparatus, and method for improving the user experience when accessing web pages containing embedded objects. In one embodiment, information regarding the contents of a locally accessible cache is added to a request directed to a web server. The information is used to control certain aspects of a pre-fetch process that is designed to reduce network latency affects and improve network resource utilization, thereby improving a user's experience. The cache contents information may be provided to an intermediate server via a modification to an existing request-response protocol, with the information being encoded or compressed if desired to reduce data transport requirements. The information is used by the intermediate server to determine whether to request an embedded object referenced in the requested resource or web page, and to determine if a browser having access to the cache will request the object or access the object from the local cache.

In one embodiment the present invention is directed to a method of optimizing the servicing of a request from an application for a resource, and includes forming a request by the application for a resource, determining a contents of a storage medium accessible by the application, modifying the request to include information regarding the contents of the storage medium, communicating the request to a network node, intercepting the communicated request at an intermediate node, storing the information regarding the contents of the storage medium at the intermediate node, forwarding the request to the network node, receiving a response to the request at the intermediate node, processing the response to identify one or more embedded objects referenced in the response, identifying one or more embedded objects referenced in the response that are not contained in the storage medium accessible by the application, requesting from the network node (without further user intervention), the one or more objects referenced in the response that are not contained in the storage medium accessible by the application, receiving the one or more objects referenced in the response that are not contained in the storage medium accessible by the application, and in response to a request from the application for an embedded object referenced in the response, the application accesses the storage medium if the requested object is contained in the storage medium and the application accesses the received one or more objects referenced in the response that are not contained in the storage medium if the requested object is not contained in the storage medium.

Other objects and advantages of the present invention will be apparent to one of ordinary skill in the art upon review of the detailed description of the present invention.

DETAILED DESCRIPTION OF THE INVENTION

The present invention is directed to systems, apparatus, and methods for enhancing a user's experience when retrieving requested content over a network. As the inventors of the present invention have recognized, a user's experience is enhanced when some or all of the following criteria are satisfied:

(1) it takes less time to retrieve requested content;

(2) the amount of traffic between the client and server is reduced when accessing the same service or resource multiple times;

(3) the quality/service level of the communications channel between the client and server is more reliable/stable; and (4) the client is able to efficiently access and present content that might otherwise not be available.

Figure 1:
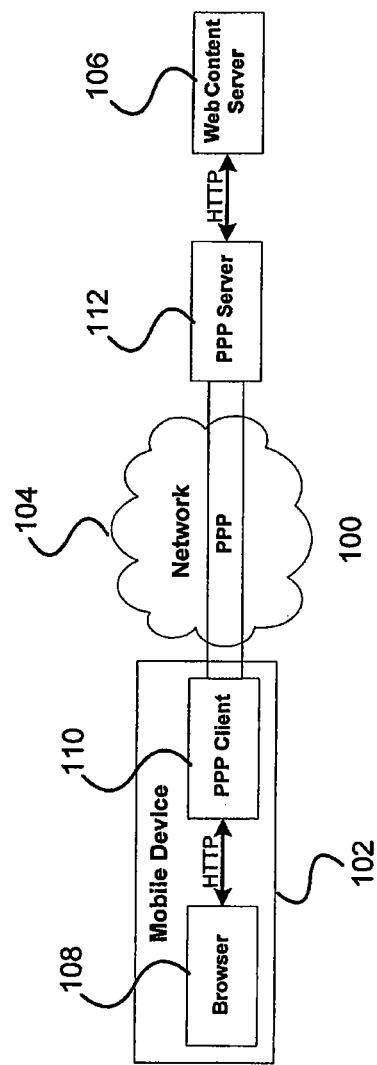
FIG. 1 is a block diagram of the components of a prior art system that can be used to reduce the latency and network characteristics that may degrade a user's experience.
Figure 2:
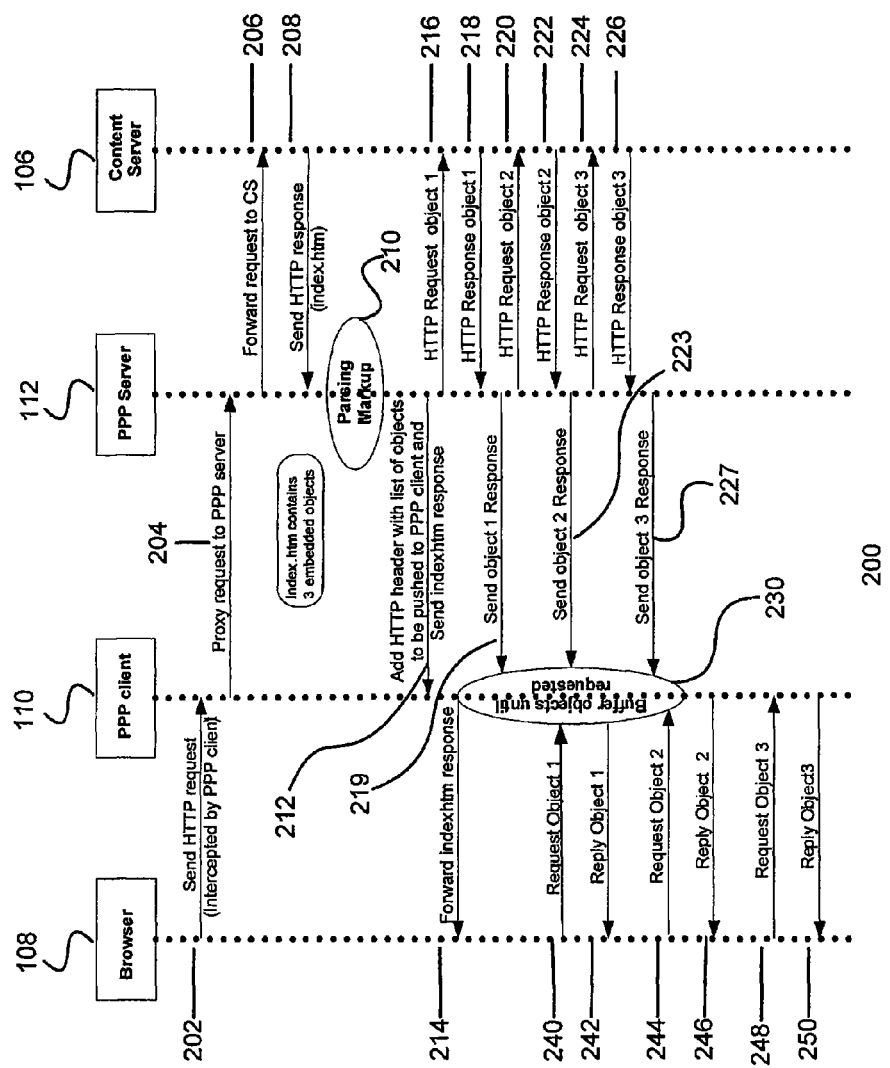
FIG. 2 is a flowchart illustrating the request/response message flow between the functional elements of FIG. 1 when implementing that version of a parse-push protocol.

Although the PPP approach can deliver improved performance with respect to the standard implementation, as the present inventors have recognized, the PPP and similar approaches have an important disadvantage that produces sub-optimal performance. This is because the standard implementation of PPP described previously with reference to FIGS. 1 and 2 does not take into account the possibility that the browser has access to cached data that may be used to respond to a request, e.g., one of the requested embedded objects. For example, PPP server 112 which is in control of the process of pushing the embedded objects to PPP client 110 for eventual delivery (upon request) to browser 108, may not be aware that some or all of those objects are available to the browser by virtue of being contained in a browser cache, or other locally accessible storage location. This lack of information or awareness by the browser can impact the overall performance, providing in a worst case scenario, the unnecessary overhead of the transmission of all objects embedded within the requested web page.

Note that although the current invention proposes an enhancement to a standard implementation of the PPP protocol, it is not limited to that protocol. It may be utilized to provide improved performance with other optimization protocols, and can be incorporated into a protocol and system that have the following characteristics:

(1) The protocol follows a general request/response model—a client issues a request for content or a resource, and a server responds by providing a response containing a reference to the content or resource, or the content or resource itself. Example protocols include HTTP, WAP, and similarly operating protocols;

(2) When a response is received by a node on the network, the response may be processed (e.g., parsed) to identify the embedded objects, content, references, etc. This means that a response can be processed to identify content (images, video, links, etc.) or other items that may be the subject of a future request by the client; and (3) The client side device has access to a local storage medium, e.g., a cache that may be used to store information (e.g., data, objects, content, etc.) that may be the subject of a subsequent request.

The current invention provides a stateless and efficient means for improving the performance of the PPP optimization protocol or similar protocols. The present invention obtains information about the contents of a local cache and provides that information to the system elements that are involved in coordinating the retrieval of embedded objects, where such objects may refer to a reference or link to a resource, an image, JavaScript™, style-sheet, etc. As such, the present invention does not require the use of a separate cache contents database and/or synchronization protocol to ensure that knowledge of the local cache contents is communicated to other system elements, and is used, where applicable, to reduce the network traffic and latency in serving responses to requests for embedded objects.

As will be discussed, the current invention utilizes a pair of entities placed between the browser and the content server. In this description, the current invention will be referred to as CAP, which stands for "Cache-Aware Protocol", and will be described in the context of a parse-push protocol, although as noted the inventive approach may be utilized with protocols other than those explicitly described.

Figure 3:
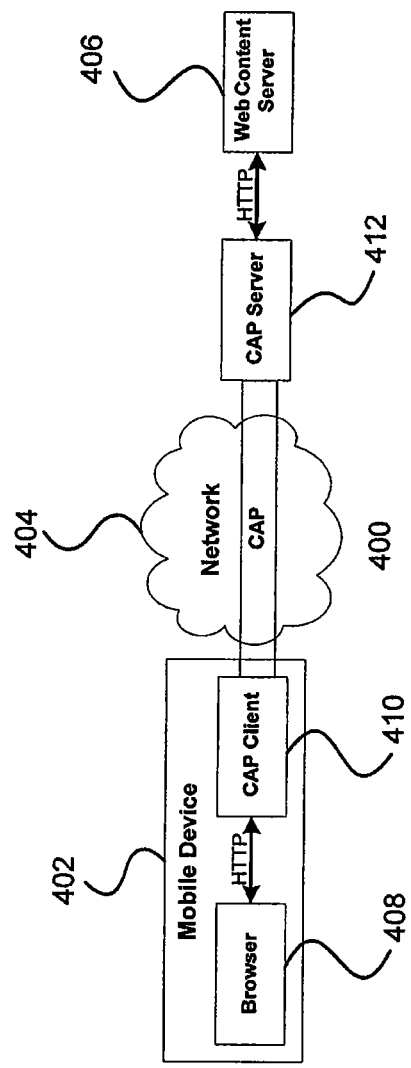
FIG. 3 is a block diagram of the components of a system that can be used to improve the performance of an optimization protocol.

FIG. 3 is a block diagram of the components of a system 400 that can be used to improve the performance of an optimization protocol. As shown in FIG. 3, system 400 includes a mobile device 402 that communicates over a network 404 with a web server 406. An application in mobile device 402, shown in the figure as a browser 408 issues a request in conformance with a protocol (e.g., HTTP). The request is transferred over network 404 to web server 406, which processes the request and prepares a response. The response is transferred over network 404 to mobile device 408. Note that mobile device is typically a mobile wireless phone, and network 404 is typically a wireless network or combination of wire line and wireless networks.

In accordance with one implementation of the present invention, a client side element, depicted as CAP client 410, and server side element, depicted as CAP server 412 are introduced. Note that as shown in the figure, CAP client 410 communicates with browser 408 using a HTTP protocol, and that CAP client 410 is positioned in the data flow between browser 408 and network 404. CAP client 410 may be integrated with mobile device 402, or may be a separate element that is in communication with browser 408 in mobile device 402. CAP server 412 communicates with web server 406 using a HTTP protocol, and is positioned between web server 406 and network 404. CAP server 412 may be positioned as a node on network 412, similarly to web server 406, or may be positioned as part of another network element (including web server 406).

As mentioned, CAP client 410 may be a separate device in communication with browser 408; it may also be a proxy process or a set of library functions directly embedded in browser 408 of mobile device 402 that is capable of implementing the CAP protocol.

Figure 4:
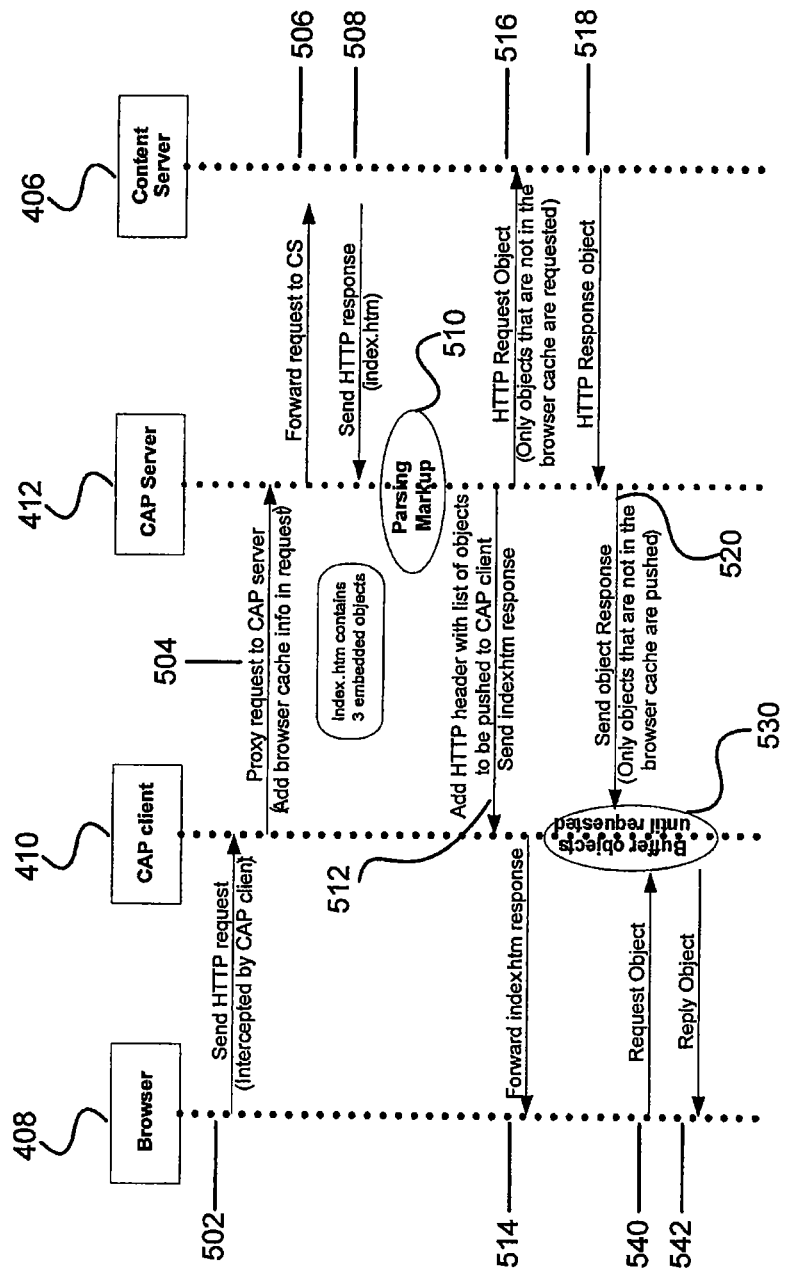
FIG. 4 is a flowchart illustrating the request/response message flow between the functional elements of FIG. 3 when implementing a version of the cache aware protocol of the present invention.

FIG. 4 is a flowchart 500 illustrating the request/response message flow between the functional elements of FIG. 3 when implementing a version of the cache aware protocol of the present invention. As shown in the figure, a typical flow of request/response messages would be as follows:

(1) Browser 408 formulates a request for a web page or object (step 502). In accordance with the present invention, the request (shown in the figure as a HTTP request, although as noted, other protocols may be utilized), the request is intercepted by CAP client 410.

(2) CAP client 410 is configured to modify the request from browser 408 by adding to that request information regarding the contents of a local cache accessible by browser 408. The modified request is then forwarded to CAP server 412 (step 504). This modification may be implemented by adding cache contents data to a header of the request or to a field that can be utilized for that purpose.

For example, when a browser requests content using the HTTP protocol, the request generally has the form of a GET instruction directed to a specified server (Host):

GET/HTTP/1.1

Host: www.example.com

. . .

Depending on the browser or the choice of implementation, different HTTP fields could be added to the request (e.g., user-agent, accept-encoding, etc) by CAP client 410. It may also be possible to add non-standard fields to the request, if they are preceded by an "x-", as for example, "x-forwarded-for". The intent is to add a new X-field that contains information on which objects, or which objects relevant to the request, are available to the browser. The objects may be available either because they are located in the browser's cache or are locally available to the browser.

Note that it may be desirable to reduce the amount of information that is required to be transferred regarding the cache contents, and/or the overhead in obtaining and preparing that information by determining which stored objects are relevant to responding to the request (instead of providing information regarding all objects stored in the cache). For example, one possible approach to determine which stored objects are relevant to a request is by structuring the way data is stored in the cache to facilitate easier identification of "relevant" objects. As an example, the cache or accessible storage medium may be indexed by "host", i.e., all objects requested from a particular web server (e.g. www.example.com) are stored together in the same structure. Then, if the browser requests content from the host www.example.com, only information regarding cached objects for that particular host are included in the request provided to the CAP server. Note that the current invention does not depend upon any particular caching structure for the browser. Further, the CAP client of the current invention may include its own local cache distinct from, or as a substitute for, the browser's cache.

Thus, one aspect of the present invention is that the CAP client is made aware of the contents of a local cache, either in the browser and/or in the CAP client, and is capable of adding information regarding the contents of the cache to a request created by the browser. Note that certain (or all) functions of the CAP client may be integrated within the browser so that in such a case, the browser is the element adding the information regarding the cache contents to the request. Regardless of the specific operational details, the inventive method results in communicating information about the local cache contents to other elements of the network. And, because the information is provided by modifying an existing protocol and utilizing (where feasible) mechanisms to reduce the amount of data transferred, communication of the cache contents information does not add significant overhead to the transmission of the message, nor does it significantly increase network traffic.

(3) Upon receipt of the modified message, CAP server 412 examines the field, header, or other protocol element used to convey the cache contents information. If the protocol element is not present, it may indicate that either there is no CAP client or that the local cache is empty. To differentiate between the possibilities, it may be decided to implement the invention by having CAP client 410 add a field to notify CAP server 412 of its presence, for example, by adding "x-cap-client-active:".

As will be described in greater detail, if CAP server 412 finds information about the local cache contents, it uses that information to filter the list of possible objects to request from content server 406 and ultimately "push" to CAP client 410. Thus, information regarding the contents of the local cache is used to:

(a) determine which, if any, embedded objects to request from the server to which the request is directed (after examining the response to determine the embedded objects and compare those with the known contents of the local cache);

(b) determine which objects to push to the CAP client for eventual delivery to the browser; and (c) in the operation of the browser or other application, determine whether to request an embedded object from another network element or instead retrieve the object from the local cache.

(4) CAP server 412 forwards the request to content server 406 (step 506). Content server 406 processes the request and prepares a response, which is sent to CAP server 412 (step 508). Note that the CAP server 412 acts as a HTTP proxy server, translating between the CAP and HTTP protocols as required.

(5) CAP server 412 parses the received response to determine the content type(s) of the response (step 510). For example, if the content type is a markup content (HTML, XML, XHTML, etc.), server 412 parses the response to identify all embedded objects in the response (e.g., by determining the URI or other form of reference for each object). As noted, an "embedded" object may refer to a reference or link to a resource, an image, JavaScript™, style-sheet, etc. Note that if the response is not markup content or of a type susceptible to the described parsing operation, it may simply be forwarded to the CAP client 410, which will forward it to the browser 408.

(6) In order to conserve resources and minimize data transfer, prior to providing the response to CAP client 410, CAP server 412 may compare the embedded objects identified from the response to the information added to the request regarding the objects stored in the local cache. This is done to remove those objects known to already be stored in the local cache from the list of embedded objects that will be provided as part of the response. The response is then pushed to the CAP client 410 (step 512), with a list of the references for the embedded objects that were identified in the parsing step, but are not stored in the local cache. Note that the list of object references (e.g., URIs) can be provided, for example, by inserting them into a HTTP header in the message. The list is used to make CAP client 410 aware of which objects are going to be pushed to it by CAP server 412. Note that if desired, the list of references to the embedded objects may be represented by a hashcode or other form of encoding mechanism in order to reduce the amount of data required to represent the objects. Examples of possible hashing mechanisms include CRC32, MD5, or any other suitable means for representing the information.

(7) The CAP client 410 then forwards the response to browser 408 (step 514). Browser 408 now has received the standard response to its request (e.g., a web page containing references to embedded objects). Note that CAP client 410 may act to ensure that the response forwarded to browser 408 is compliant with the HTTP specification. This may include, for example, removing the HTTP headers added by CAP server 412.

(8) CAP server 412 then issues a request or requests for each of the identified objects in the original response that were not present in the local cache (step(s) 516). Thus, CAP server 412 filters the list of embedded objects identified during the parsing operation, requesting only those objects on the list that are not present in the local cache or other storage medium accessible by the browser. In response to the request or requests, web server 406 responds by providing the requested object to CAP server 412 (step(s) 518). Upon receipt of a response, CAP server 412 pushes the object to CAP client 410 (step(s) 520), along with an indicator of the reference (e.g., URI) of the pushed object. Note that only objects not present in the local cache are pushed to CAP client 410 in this step.

(9) CAP client 410 stores the received object(s) and reference indicators in a local buffer (step 530).

(10) Each time that browser 408 issues a request for an embedded object in the page (step(s) 540), CAP client 410 intercepts the request and responds to that request by: (a) directly providing the requested object (if stored in CAP client 410, as in step 542); (b) waiting for CAP server 412 to push the requested object if it is not stored in CAP client 410 or the local cache and is present in the list pushed to CAP client 410 in step 512; or (c) submits a request for the object to CAP server 412. Note further that in some cases, the request might be submitted to web content server 406 instead if that approach would lead to a more optimal use of network infrastructure resources and result in a more desirable user experience.

As described, the present invention is directed to a system, apparatus, and method for improving the user experience when a user requests a resource such as a web page for presentation on a mobile device (such as a wireless phone, PDA, laptop, etc.). Among other things, the invention introduces the concept of a local cache that may contain objects embedded within a requested web page. Information regarding the cache contents is communicated to other network elements using an existing protocol, so as to minimize the additional overhead (if any) placed on the network by the transfer of the information. The information is used by other network elements to become aware of the contents of the local cache and in response to pre-fetch only those embedded objects not in the local cache. This reduces the request-response messages used to access the objects and minimizes the use of network resources to obtain the objects, while reducing latency in responding to the user request and improving the user experience.

As an example, assume that the CAP client is a set of library functions implemented within a browser. The browser includes a local cache, although as noted, this storage medium may be external to the browser and accessible by the browser. The cache may store data in several ways; randomly, pseudo-randomly, or structured/organized in some manner. For example, the cache may be configured to store data in a way that is organized according to the source of that data. For objects, this might involve storage based on the source or host of those objects. Data storage within the cache may also be implemented in a manner that relies on storing and indexing objects on a per web page basis or similar method.

Assume for example, that the cache stores data in a structured manner where objects obtained from a common source are associated with each other. This might mean that objects from a common source are linked on a "per web host" basis (e.g., images for google.com are stored in a manner so that all such images can be accessed in a known set of storage locations). For purposes of this example, define "x-cap-cache-objects" as the HTTP field in which information regarding the cache contents is transferred to other network elements (e.g., the CAP server).

In order to reduce the amount of data regarding the cache contents being transferred, it may be desirable to encode or compress the information. For example, it may be desirable to provide the added information in the form of a hashcode, derived by processing the object URL. As an example, an image defined by "/image/logo.gif", could be represented by a hashcode having a 32 bit value, e.g., '0xABCDEF'. Note that it is possible that for different web pages (i.e., a different "host:" field), an image with the same URL exists. For this reason it may be beneficial to store the cached objects in a per-host or other structured manner in the cache. Note that this processing of the URL or other identifying information is intended to more efficiently use the available bandwidth, and other suitable methods could be utilized, such as index values or an assignment of certain terms to specific representations.

Continuing with the example implementation, for the first request to a new HTTP connection, the browser calls an API (application programming interface) of the CAP client. The CAP client adds to the request the "x-cap-cache-objects" field and inserts the hashcodes of all objects stored in the cache for that particular destination host. The CAP client is aware of the cached content either because it has a link to the local cache or the browser passed the information to the CAP client. If the cache is structured to store its contents in accord with a different structure (i.e., other than by associating all content from the same host), then that structure is used as the way to determine which hashcodes to insert into the request.

As an example, encoding the hashcodes with 8 bytes plus a space leads to 9 bytes overhead per entry added to the request. If for example, there are 50 objects stored in the local cache for the host in question, then this adds to the first request 400 bytes+the x-cap-cache-objects header. Note that a 24 or 16 bits (6 or 4 bytes) hashcode could instead be used to reduce possible overhead further. Further, note that the choice of the bit size for the hashcode may be affected by considerations of its effect on the frequency of potential errors attributable to hashcode collisions, i.e., a situation in which a hashcode could be mapped to more than one piece of data. This situation could arise because, for example, more than one URL could result in the same hashcode result. Thus, depending upon the network environment, the hashcode size may be altered to balance the risk of error against the efficiency of the optimization process.

When the request is received at the CAP server, the CAP server forwards the request to the content server. Upon receipt of the response (e.g., the resource or HTML page), the CAP server parses or otherwise processes the markup page to identify all embedded objects on the page. Note that in this context, an embedded object may be a reference or link to a resource, an image, JavaScript™, style-sheet, etc. Using the same hashing algorithm or other encoding method as used to index the cached objects, the CAP server applies the encoding method to the identified objects and compares the results to the encoded information regarding the cache contents. The CAP server then filters the list of encoded information to remove the data regarding objects contained in the cache. The CAP server then requests the objects not contained in the local cache from the content server and pushes them to the CAP client. In this way the number of objects requested, the corresponding request-response messages, and the network overhead and use of network resources may be reduced by using information regarding the contents of the local cache.

Upon receipt of the requested objects from the CAP server by the CAP client, they may be stored in a temporary local cache of the Cap client, in the browser's cache, or in another local cache accessible by the CAP client or browser. When the browser requests such an object, they are present locally and may be obtained more readily.

Figure 5:
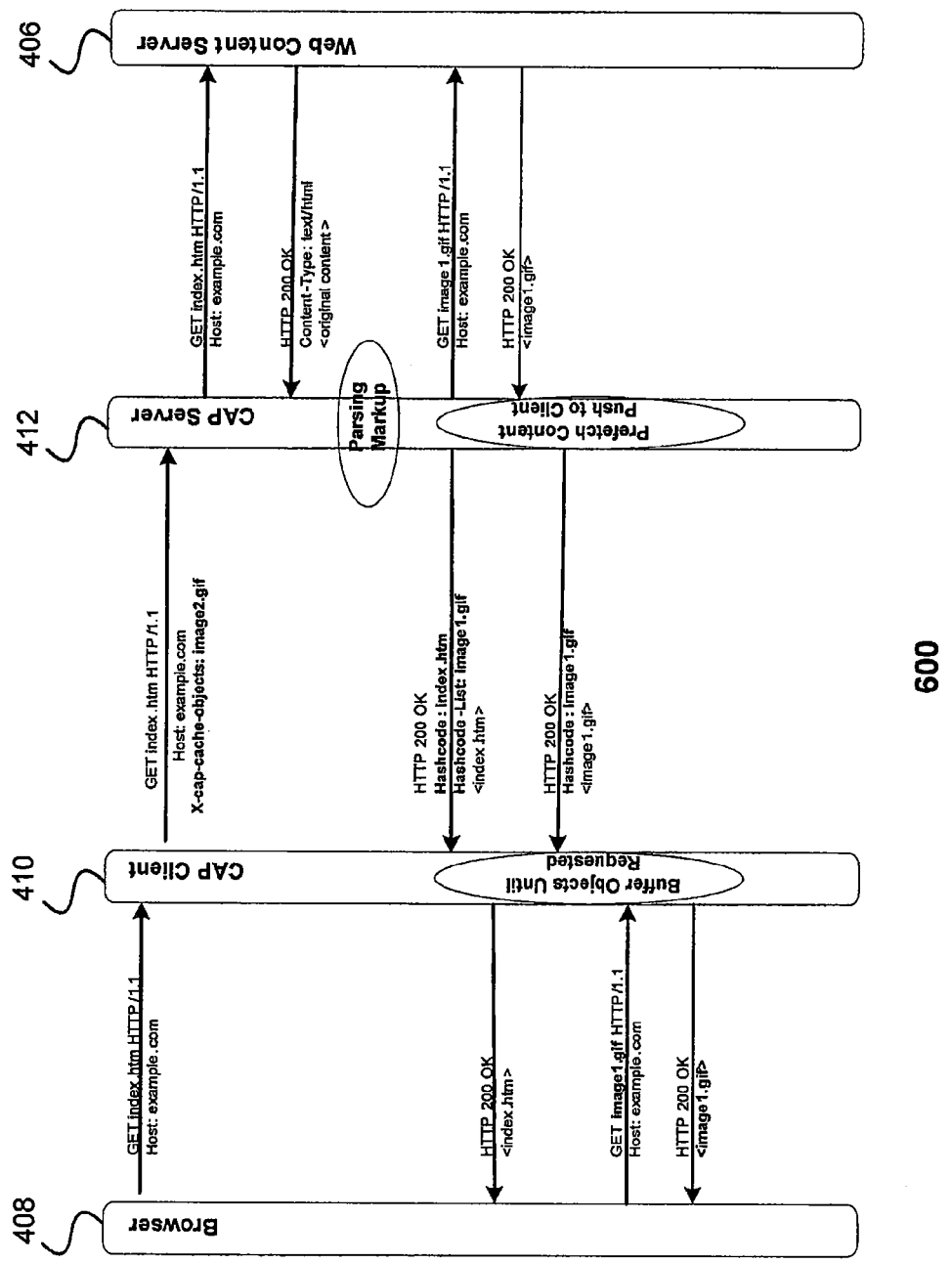
FIG. 5 is a chart illustrating an example of the process described in FIG. 4, showing the cache contents information added to the HTTP protocol.

FIG. 5 is a chart 600 illustrating an example of the process described in FIG. 4, showing the cache contents information added to the HTTP protocol. The figure indicates examples of the HTTP request-response data used to request a resource (e.g., "GET Index.htm HTTP/1.1 Host: example.com") or receive a response from the web server (e.g., "HTTP 200 OK <image 1.gif>"). The figure also illustrates the information that may be added to the protocol to convey information regarding the local cache contents (e.g., "X-cap-cache-objects: image2.gif") in accordance with one implementation of the present invention. Note that in the example shown in the figure, the cache contains one of two images that are being requested; thus, only one of the two images is pre-fetched and pushed to the CAP client. Note that the cache contents information shown in the figure, and the manner in which the HTTP protocol is modified to convey that information is only illustrative of one possible implementation of the invention and is not intended to limit other possible implementations.

In accordance with the present invention, there has been described a system, apparatus, and method for improving the user experience when accessing web pages containing embedded objects. In one embodiment, information regarding the contents of a locally accessible cache is added to a request directed to a web server. The information is used to control certain aspects of a pre-fetch process that is designed to reduce network latency affects and improve network resource utilization, thereby improving a user's experience. The cache contents information may be provided to an intermediate server via a modification to an existing request-response protocol, with the information being encoded or compressed if desired to reduce data transport requirements.

The information is used by the intermediate server to determine whether to request an embedded object referenced in the requested resource or web page, and to determine if a browser having access to the cache will request the object or access the object from the local cache.

Various modifications to the inventive system, apparatus, and method may be introduced within the concept of the present invention. For example, the local cache may be part of the application forming the request (e.g., a browser) or may be a separate storage medium that is accessible by the application. The CAP client may be incorporated as instructions or routines within the application, or may be a separate functional element in communication with the application. Similarly, the CAP server may be incorporated as instructions or routines within the web server or a proxy server performing other functions (e.g., a gateway coupling two networks), or may be implemented as a separate network element.

The local cache contents may be stored in a structured or indexed manner to assist in more efficient determination of the stored data of relevance to a specific request. The information regarding the local cache contents may be encoded, compressed or otherwise processed to provide security and/or a reduction in the network resources required to communicate the information to other network elements. The information may be appended to a request via a modification to the request-response protocol, such as by adding a header or field in order to reduce the overhead cost of transporting the information. The response provided by the web or content server may be parsed by any relevant and suitable method, and the embedded objects that are identified may be filtered to remove those objects known to be in the local cache by any suitable method.

A further possible implementation is one that occurs as a result of the "aging" of an object stored in the locally accessible storage medium. The possibility arises that a stored object may be "stale" because a newer version is available. In such a case, even though a version of the object is present in the cache or local storage medium, the stored version may not be the most desirable one. To address this potential problem, the present invention may be implemented in a manner in which information regarding the date or version of the object in the local cache ("if-modified-since") is included, instead of just an identification of the object. If the object or other content has not been modified since that date, the web server may issue a "HTTP 304 Not-Modified" response, and no content will be provided for that object. In such a case, the application will use the object stored in its cache. If the object or content has been modified since the provided date or version, then it can be provided by the web server and ultimately to the CAP server, CAP client, and browser.

Note that the present invention does not require a complex database management system and/or data synchronization process to ensure that the network nodes are aware of the contents and relevance of the local cache. Instead, the invention utilizes a modification of the underlying request-response protocol to transport the cache contents information to other network nodes and control the pre-fetch operations, with this control being based on the request-response messages. The present invention provides an optimal use of network resources by utilizing the existing protocol as the transport mechanism, instead of creating additional messages to transport the cache contents information. Note that if there is no CAP (or equivalent) server in the network that is able to understand the added header or fields, by default (as found in the HTTP specification), the information is not acted upon. As a result, in such an implementation, the proposed solution will not introduce undesired behavior if there is no CAP server in the path. Further, because those objects that are not currently present in the local cache (and "fresh", if version or date information for an object is provided) are pushed to the application in response to the request sent to the web server, there is a significant improvement in the user experience when objects are available from the local cache.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

What is claimed is:

1. A method of optimizing a servicing of a request from an application for a resource, comprising:
   forming a request by the application for a resource;
   determining a contents of a storage medium accessible by the application;
   modifying the request to include information regarding the contents of the storage medium;
   communicating the request to a network node;
   intercepting the communicated request at an intermediate node;
   storing the information regarding the contents of the storage medium at the intermediate node;
   forwarding the request to the network node;
   receiving a response to the request at the intermediate node;
   processing the response to identify one or more embedded objects referenced in the response;
   identifying one or more embedded objects referenced in the response that are not contained in the storage medium accessible by the application;
   requesting from the network node, without further user intervention, the one or more objects referenced in the response that are not contained in the storage medium accessible by the application;
   receiving the one or more objects referenced in the response that are not contained in the storage medium accessible by the application;
   wherein, in response to a request from the application for an embedded object referenced in the response, the application accesses the storage medium if the requested object is contained in the storage medium and the application accesses the received one or more objects referenced in the response that are not contained in the storage medium if the requested object is not contained in the storage medium.

2. The method of claim 1, wherein the application is a browser and the storage medium accessible by the application is a local cache.

3. The method of claim 1, wherein modifying the request to include information regarding the contents of the storage medium further comprises modifying an element of a protocol used to control communication of the request.

4. The method of claim 1, wherein determining the contents of the storage medium accessible by the application further comprises determining the contents of the storage medium that is relevant to responding to the request.

5. The method of claim 1, wherein determining the contents of the storage medium accessible by the application further comprises encoding data regarding the contents of the storage medium.

6. The method of claim 5, wherein encoding data regarding the contents of the storage medium further comprises performing a hash code on a reference for the contents of the storage medium.

7. The method of claim 1, wherein storing the information regarding the contents of the storage medium at the intermediate node further comprises storing the information until each of the one or more embedded objects referenced in the response has been provided to the application.

8. The method of claim 1, wherein
modifying the request to include information regarding the contents of the storage medium further comprises modifying the request to include an identification of an object and an indication of a date or version of the object;
identifying one or more embedded objects referenced in the response that are not contained in the storage medium accessible by the application further comprises identifying one or more embedded objects referenced in the response that are either not contained in the storage medium accessible by the application or are contained in the storage medium but are stale;
requesting from the network node, without further user intervention, the one or more objects referenced in the response that are not contained in the storage medium accessible by the application further comprises requesting from the network node, without further user intervention, the one or more objects referenced in the response that are either not contained in the storage medium accessible by the application or are contained in the storage medium but are stale;
receiving the one or more objects referenced in the response that are not contained in the storage medium accessible by the application further comprises receiving the one or more objects referenced in the response that are either not contained in the storage medium accessible by the application or are contained in the storage medium but are stale; and
wherein, in response to a request from the application for an embedded object referenced in the response, the application accesses the storage medium if the requested object is contained in the storage medium and is not stale, and the application accesses the received one or more objects referenced in the response if the requested object is either not contained in the storage medium or is contained in the storage medium but is stale.

9. A method of providing a response to a request for a resource from an application, comprising:
obtaining information regarding the contents of a storage medium accessible by the application at a network node;
receiving a response to the request at the network node;
processing the response to identify one or more embedded objects referenced in the response;
identifying one or more embedded objects referenced in the response that are not contained in the storage medium accessible by the application;
requesting, without further user intervention, the one or more objects referenced in the response that are not contained in the storage medium accessible by the application;
receiving the one or more objects referenced in the response that are not contained in the storage medium accessible by the application;
wherein, in response to a request from the application for an embedded object referenced in the response, the application retrieves the object from the storage medium if the requested object is contained in the storage medium and the application accesses the received one or more objects referenced in the response that are not contained in the storage medium if the requested object is not contained in the storage medium.

10. The method of claim 9, wherein obtaining information regarding the contents of a storage medium accessible by the application at a network node further comprises receiving the information as a part of the request from the application.

11. The method of claim 10, wherein receiving the information as a part of the request from the application further comprises receiving the information as a modification to a protocol used to control communication of the request.

12. The method of claim 9, wherein the obtained information is regarding the contents of the storage medium that are relevant to responding to the request.

13. The method of claim 9, wherein the application is a browser.

14. The method of claim 9, wherein
receiving the one or more objects referenced in the response that are not contained in the storage medium accessible by the application further comprises receiving the one or more objects referenced in the response that are not contained in the storage medium accessible by the application and providing the one or more objects to another network element; and
wherein, in response to a request from the application for an embedded object referenced in the response, the application retrieves the object from the storage medium if the requested object is contained in the storage medium and the application accesses the received one or more objects referenced in the response that are not contained in the storage medium from the another network element if the requested object is not contained in the storage medium.

15. A method of processing a request for a resource by an application, comprising:
determining contents of a storage medium accessible by the application;
incorporating information regarding the contents of the storage medium into the request;
receiving a response to the request, wherein the response includes references to a plurality of embedded objects, the embedded objects including an object contained in the storage medium and an object not contained in the storage medium accessible by the application;
requesting, without further user intervention, the object referenced in the response not contained in the storage medium accessible by the application; receiving the object referenced in the response not contained in the storage medium accessible by the application;
wherein, in response to a request from the application for an embedded object referenced in the response, the application retrieves the object from the storage medium if the requested object is contained in the storage medium and the application accesses the received object referenced in the response not contained in the storage medium if the requested object is not contained in the storage medium.

16. The method of claim 15, wherein determining contents of a storage medium accessible by the application further comprises determining contents of the storage medium relevant to responding to the request.

17. The method of claim 15, wherein incorporating information regarding the contents of the storage medium into the request further comprises modifying an element of a protocol used to transport the request, the request thereby including the information.

18. The method of claim 15, wherein the application is a browser.

19. A non-transitory computer readable medium containing instructions that when executed cause a processor to implement a process, the process comprising:
   determining contents of a storage medium accessible by an application, the application configured to form a request for a resource;
   modifying a protocol used to transport a request from the application to include information regarding the contents of the storage medium;
   communicating the modified request to a first network element; and
   receiving a response to the request, the response including references to a plurality of embedded objects, the embedded objects including an object contained in the storage medium accessible by the application and an object not contained in the storage medium accessible by the application;
   wherein, in response to a request from the application for an embedded object referenced in the response, the application retrieves the object from the storage medium if the requested object is contained in the storage medium accessible by the application and the application accesses the received object referenced in the response not contained in the storage medium from a second network element if the requested object is not contained in the storage medium accessible by the application, wherein the second network element is configured to
   request, without further user intervention, the object referenced in the response not contained in the storage medium accessible by the application; and
   receive the object referenced in the response not contained in the storage medium accessible by the application.

20. A non-transitory computer readable medium containing instructions that when executed cause a processor to implement a process, the process comprising:
   receiving a request from an application, the request including information regarding contents of a storage medium accessible by the application, the information being incorporated into the request by modifying an element of a protocol;
   storing the information regarding the contents of the storage medium accessible to the application;
   forwarding the request to a network node;
   receiving a response to the request from the network node;
   processing the response to identify one or more embedded objects referenced in the response;
   identifying one or more embedded objects referenced in the response that are not contained in the storage medium accessible by the application;
   requesting, without further user intervention, the one or more objects referenced in the response that are not contained in the storage medium accessible by the application; and
   receiving the one or more objects referenced in the response that are not contained in the storage medium accessible by the application.

21. The non-transitory computer readable medium of claim 20, wherein the request is generated by a browser.

22. The non-transitory computer readable medium of claim 20, wherein the information regarding the contents of the storage medium accessible by the application further comprises information regarding the contents that is relevant to responding to the request.

23. The non-transitory computer readable medium of claim 20, wherein the process further comprises:
   providing information regarding the one or more objects referenced in the response that are not contained in the storage medium accessible by the application to the response received from the network node.

* * * * *